US012655810B2

(12) United States Patent
Aupetit et al.

(10) Patent No.: US 12,655,810 B2
(45) Date of Patent: Jun. 16, 2026

(54) TURBINE ENGINE TURBINE ASSEMBLY

(71) Applicant: SAFRAN CERAMICS, Le Haillan (FR)

(72) Inventors: Christophe Paul Aupetit, Moissy-Cramayel (FR); Thierry Guy Xavier Tesson, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/881,669

(22) PCT Filed: Jul. 6, 2023

(86) PCT No.: PCT/FR2023/051035
§ 371 (c)(1),
(2) Date: Jan. 6, 2025

(87) PCT Pub. No.: WO2024/013444
PCT Pub. Date: Jan. 18, 2024

(65) Prior Publication Data
US 2025/0314217 A1      Oct. 9, 2025

(30) Foreign Application Priority Data

Jul. 11, 2022      (FR) ........................................ 2207113

(51) Int. Cl.
*F02K 1/04*          (2006.01)
*F02K 1/80*          (2006.01)
(52) U.S. Cl.
CPC ................ *F02K 1/04* (2013.01); *F02K 1/805* (2013.01); *F05D 2240/55* (2013.01); *F05D 2260/30* (2013.01); *F05D 2300/6033* (2013.01)

(58) Field of Classification Search
CPC ... F02K 1/04; F02K 1/80; F02K 1/805; F05D 2240/55; F05D 2260/30; F05D 2300/6033;
(Continued)

(56) References Cited

U.S. PATENT DOCUMENTS

2010/0205930 A1*   8/2010   Conete ...................... F02K 1/04
                                                              29/889.22
2014/0241863 A1*   8/2014   Tardif ...................... F02K 1/80
                                                              415/145
(Continued)

FOREIGN PATENT DOCUMENTS

EP          1873385 A2      1/2008
FR          3115832 A1      5/2022

OTHER PUBLICATIONS

International Search Report in corresponding PCT Application No. PCT/FR2023/051035 mailed Oct. 10, 2023, 4 pages.

*Primary Examiner* — Elton K Wong
(74) *Attorney, Agent, or Firm* — Cozen O'Connor

(57) ABSTRACT

A turbine assembly is used with a turbine having a longitudinal axis, the assembly having an exhaust cone with an upstream portion and a downstream portion, the upstream portion includes an upstream internal annular wall and an upstream external annular wall radially surrounding the upstream internal annular wall, the downstream portion including a downstream external annular wall. The upstream external annular wall and the downstream external annular wall are fixed to the upstream internal annular wall by means of a plurality of connecting members, the connecting members being elastically deformable at least in an axial direction and in a radial direction and circumferentially arranged, each connecting member being fixed to the upstream exter- (Continued)

nal annular wall, to the downstream external annular wall, and to the upstream internal annular wall.

21 Claims, 7 Drawing Sheets

(58) Field of Classification Search
CPC .. F05D 2260/941; F01D 25/24; F01D 25/243;
F01D 25/26
See application file for complete search history.

(56)                    References Cited

U.S. PATENT DOCUMENTS

2018/0066605 A1 *    3/2018   Todorovic ................. F02K 1/80
2023/0392518 A1 *   12/2023   Joret ....................... F02K 1/805

* cited by examiner

TURBINE ENGINE TURBINE ASSEMBLY

CROSS-REFERENCE TO RELATED APPLICATIONS

This application is a US National phase Application of PCT/FR2023/051035 filed Jul. 6, 2023, which claims priority to French Patent Application No. 2207113 filed Jul. 11, 2022, both of which are hereby incorporated in their entirety.

TECHNICAL FIELD

This disclosure relates to a turbine engine turbine assembly, in particular to an exhaust cone in such an assembly which is partly made of a ceramic matrix composite material. It also relates to a turbine comprising such an assembly and to a turbine engine comprising such a turbine.

BACKGROUND

Conventionally, as shown in FIG. 1, a turbine engine 10 of the turbofan type comprises, from upstream UPST to downstream DWST in the direction of circulation of gases in turbine engine 10: a fan 12, a low-pressure compressor 14a, a high-pressure compressor 14b, a combustion chamber 16, a high-pressure turbine 18a, a low-pressure turbine 18b, and an exhaust nozzle 20. High-pressure compressor 14b and low-pressure compressor 14a are respectively connected to a high-pressure turbine 18a and a low-pressure turbine 18b by a respective shaft extending in the longitudinal direction X of rotation of the shafts of the turbine engine.

In the following, orientation qualifiers such as "longitudinal", "radial", and "circumferential" are defined in reference to the longitudinal axis X.

The air flow entering the turbine engine is divided, downstream of fan 12, into a primary annular air flow entering an annular flow path 22a referred to as primary, and a secondary annular air flow entering an annular flow path 22b referred to as secondary which surrounds the primary annular air flow path 22a. The working parts of the low and high pressure compressors 14a, 14b, combustion chamber 16, and high and low pressure turbines 18a and 18b are located in primary annular flow path 22a.

An exhaust casing 30 is located directly at the outlet of low pressure turbine 18b. Exhaust casing 30 comprises a radially inner shell 32 and a radially outer shell 34. An annular space formed between inner shell 32 and outer shell 34 forms a portion of primary annular flow path 22a at the outlet of low-pressure turbine 18b.

Exhaust nozzle 20, or propelling nozzle, of a turbine engine 10 conventionally comprises an assembly which allows optimizing the flow of hot gases exiting the turbine. This assembly may also have the function of absorbing at least some of the noise generated by the interaction of these hot gases with the ambient air and with the flow of cold air from the fan.

The present disclosure relates in particular to this assembly located at the rear, at the downstream end, and comprising an exhaust cone 40 comprising several parts, in particular an upstream portion 40a of substantially cylindrical shape and a downstream portion 40b generally of conical shape.

Previous patent applications are known relating to the exhaust cone, in particular FR 3 115 828 A1 which relates to the connection between said cone and the exhaust casing, and FR 3 115 835 A1 which relates to the means for attachment of said cone.

More specifically, the present disclosure relates to the connection between different portions of the exhaust cone 40.

With a view to a reduction of mass and to a use at high temperatures for better turbine engine efficiency, there is a desire to introduce new ceramic matrix composite materials (CMC) for the manufacture of certain parts, replacing the metal used up to the present time.

However, these CMC materials have stiffness and expansion properties that are different from those of metal, which complicates their integration, particularly in a metal environment subject to temperature variations of large amplitude.

In particular, exhaust cone 40 may be composed of several parts made of CMC material which are assembled together. Unlike metal parts, parts made of CMC material have limited mechanical capacity, in particular they do not allow significant deformation during assembly. When assembling the parts, it is therefore necessary to ensure the parts are held in place geometrically in order to limit internal stresses and not damage the parts.

However, the geometric deformations may be significant. Indeed, manufacturing processes may generate irregularities or shape variations on finished parts that can reach several millimeters in size. These irregularities are all the more significant when the parts concerned have large dimensions, which may be greater than a meter, and when these parts are thin, which is likely to generate deformations during manufacturing.

Modeling the assembly has been carried out. Such modeling shows that there is a low tolerance to deformations if an acceptable level of stresses in the CMC material is to be maintained.

It is therefore necessary to limit deformation of the parts, in particular of the parts which are part of exhaust cone 40, or rear body. Among these parts, we can distinguish in particular upstream portion 40a of exhaust cone 40, which comprises an upstream external annular wall 50 mounted around an upstream internal annular wall 51, as can be seen in FIGS. 2 and 4. Exhaust cone 40 also comprises a downstream portion 40b comprising a downstream external annular wall 52 also partially surrounding the upstream internal annular wall 51, as illustrated in FIGS. 2 and 4. Fastening screws F arranged in annular rows allow attaching external walls 50 and 52 to internal wall 51.

To limit deformation of the parts during their assembly, it is known to propose solutions with low deformations and possibly to implement a solution involving wedging which allows filling in the gaps between parts and holding the shape of the parts. Such wedging may be solid or liquid wedging.

Solid wedging, illustrated in FIG. 3, consists of placing one or more shims C at certain locations between the parts, in this case between upstream internal annular wall 51 and upstream external annular wall 50 which are assembled together and which each have geometric irregularities in their radial cross-section, as can be seen. Along the illustrated cross-section in FIG. 3, one can see areas of contact between the external wall and the internal wall, alternating with areas of clearance where shim C may be inserted as illustrated, these areas being indicated by dotted lines. Such wedging requires control and a choice of suitable shims, i.e. a tedious working method that renders the assembly operation less industrial. In addition, solid wedging results in losing the seal established by an adjusted assembly between the two parts.

As for liquid wedging, this requires the development of a suitable interface. Furthermore, it is often limited in terms of thickness. Finally, liquid wedging requires a short implementation time, which is potentially incompatible with this step.

There is therefore a need to provide a turbine engine turbine assembly that allows the deformation of parts during assembly in the exhaust cone, in particular parts made, at least in part, of CMC material, while taking into account the limited mechanical capacity of CMC, the differential expansion between CMC and metal, the simplicity of assembly, and the restriction on the mass increase, and while ensuring the positioning of these parts so that the profile of the aerodynamic flow path is maintained.

SUMMARY

This disclosure improves the situation and aims to meet this need.

A turbine engine turbine assembly having a longitudinal axis is therefore proposed which comprises an exhaust cone comprising an upstream portion and a downstream portion, the upstream portion comprising an upstream internal annular wall and an upstream external annular wall radially surrounding the upstream internal annular wall, the downstream portion comprising a downstream external annular wall, wherein the upstream external annular wall and the downstream external annular wall are fixed to the upstream internal annular wall by means of a plurality of connecting members, said connecting members being elastically deformable at least in an axial direction and in a radial direction, said connecting members being arranged circumferentially, each connecting member being fixed to the upstream external annular wall, to the downstream external annular wall, and to the upstream internal annular wall.

By means of the invention, and in particular due to the flexibility of the connecting members which are elastically deformable at least in a radial direction and in an axial direction, the geometric irregularities of the external and internal walls can be compensated for and damage to the walls during assembly can therefore be avoided. The presence of the connecting members forms a flexible connection system between the internal walls and the external walls. In addition, by minimizing installation stresses in the walls made of CMC, the thermomechanical properties during operation are maximized. Furthermore, the elastically deformable connecting members allow elastic deformation in the radial direction and elastic deformation in the axial direction, these two deformations being independent of each other.

In addition, as the connecting members are used both for fixing the upstream internal annular wall to the upstream external annular wall as well as for fixing the upstream internal annular wall to the downstream external annular wall, the number of connecting members may be reduced and therefore savings are obtained in the mass of the connecting members required to ensure these attachments.

The features set forth in the following paragraphs may, optionally, be implemented independently of each other or in combination with each other.

The connecting members advantageously comprise a metal material. Each connecting member is preferably made as a single piece, i.e. in one piece.

The dimensions of the connecting members are advantageously adapted to the loads and to the engine context (temperature, available space in particular).

The temperature rise during operation of the turbine engine generates an expansion of the connecting members, causing a slight rotation of the upstream and downstream external annular walls around the longitudinal axis. However, this movement has no impact on the profile of the aerodynamic flow path.

Each connecting member advantageously comprises a first portion and a second portion. According to a preferred embodiment, each connecting member comprises a first portion connecting the upstream internal annular wall to the upstream external annular wall and a second portion connecting the upstream external annular wall to the downstream external annular wall.

In one variant, the first portion connects the upstream internal annular wall to the downstream external annular wall and the second portion connects the downstream external annular wall to the upstream external annular wall.

According to another variant, the first portion connects the upstream internal annular wall to the upstream external annular wall and a second portion connects the upstream internal annular wall to the downstream external annular wall.

The first portion advantageously comprises a first attachment lug for fixing to a first of said walls, preferably to the upstream internal annular wall. The second portion advantageously comprises a second attachment lug for fixing to a second of said walls, preferably to the downstream external annular wall. Each connecting member preferably comprises a third attachment lug for fixing to a third of said walls, preferably to the upstream external annular wall. The first and second portions of the connecting member are connected at the third attachment lug, the first portion comprising for example a first intermediate portion connecting the first attachment lug and the third attachment lug, the second portion comprising for example a second intermediate portion connecting the second attachment lug and the third attachment lug.

In this case, and when the first portion connects the upstream internal annular wall to the upstream external annular wall and the second portion connects the upstream external annular wall to the downstream external annular wall, the first attachment lug and the third attachment lug of the first portion may extend from the first intermediate portion in opposite directions along the circumferential direction.

The first intermediate portion preferably has a generally planar shape and may comprise two ends respectively attached to the first and third attachment lugs, the first intermediate portion having a non-zero radial component. This makes it possible to keep the upstream internal annular wall at a distance from the upstream external annular wall.

In this case, in a radial plane, an angle formed between the first attachment lug and the first intermediate portion is substantially equal to an angle formed between the third attachment lug and the first intermediate portion, at least in the unassembled state.

The unassembled state corresponds to a state in which the constituent parts of the exhaust cone are not assembled together. Conversely, the assembled state corresponds to the state of the exhaust cone with all its parts assembled and attached together. It is also possible to identify an unattached state, which may be virtual, where the parts are assembled but not yet attached together.

When the first portion is connecting the upstream internal annular wall to the upstream external annular wall and the second portion is connecting the upstream external annular wall to the downstream external annular wall, the second attachment lug and the third attachment lug may extend from the second intermediate portion in opposite directions along the axial direction.

In this case, the second intermediate portion may extend between two ends respectively attached to the second and third attachment lugs, the second intermediate portion having for example a curved shape, in particular an arc of a circle, the second and third attachment lugs preferably having substantially the same radial coordinate, at least in an unattached state.

Each connecting member advantageously has an L shape when viewed from above, with two arms connected by an angle portion, the first and second portions respectively forming the arms of the L and connected to each other at the angle portion of the L.

In this case, the arms of the L extend substantially in directions perpendicular to each other.

The first portion of the connecting members may extend substantially in a circumferential direction. The second portion of the connecting members may extend substantially axially. In such case, and when the second portion of the connecting members connects the upstream external annular wall and the downstream external annular wall, the points of attachment on these two walls of a same connecting member preferably have substantially the same radial coordinate, at least in the absence of stresses.

The first, second, and/or third attachment lugs may be substantially parallel to each other in the unassembled state. This makes it possible to keep the internal and external annular walls substantially parallel to each other in the assembled state.

The connecting members may be arranged in an annular row, the connecting members preferably being equally distributed over the annular circumference of the upstream internal annular wall. The angular distribution of the connecting members may allow controlling the positioning of the walls. The greater the number of connecting members, the more the shape is contained. The number of connecting members depends on the size, in particular the diameter, of the parts, the diameter of the attachment screws used, the forces which are transmitted, and the design principles. It therefore varies depending on the application. The number of connecting members may be approximately 40. The connecting members are preferably identical to each other.

The upstream external annular wall may have a downstream end facing an upstream end of the downstream external annular wall. Thus arranged, the upstream external annular wall and the downstream external annular wall form, radially internally, a flow surface for the primary air flow. The connecting members are preferably fixed near the downstream end of the upstream external annular wall. The connecting members are also preferably fixed near the upstream end of the downstream external annular wall. The connecting members are preferably configured to connect the downstream and upstream ends respectively of the upstream external annular wall and the downstream external annular wall to each other, while making it possible to keep these downstream and upstream ends facing each other.

The three attachment lugs advantageously respectively comprise openings for attachment elements such as attachment screws to pass through, at least one of said openings having in particular an oblong shape, preferably the openings in the second attachment lug and in the third attachment lug being oblong in shape and the opening in the first attachment lug being circular.

The upstream internal annular wall may extend only under the upstream external annular wall and not under the downstream external annular wall. This allows reducing the length of the upstream internal annular wall compared to an embodiment where it would extend under the downstream external annular wall, and therefore allows reducing the mass of the assembly.

The turbine assembly may comprise a sealing system interposed between the upstream external annular wall on the one hand, and the downstream external annular wall or the upstream internal annular wall on the other hand.

The sealing system comprises, according to one embodiment, a braided gasket, in particular of small transverse dimension, arranged radially between the connecting member, in particular at the second intermediate portion, and the upstream and downstream external annular walls. The braided gasket thus ensures sealing between the upstream and downstream external annular walls. The braided gasket is for example arranged radially between the second intermediate portion and the upstream and downstream external annular walls. As an order of magnitude, the largest transverse dimension of the braided gasket at rest may be between 5 and 15 mm.

The sealing system comprises, according to another embodiment, a braided gasket, in particular of large transverse dimension, extending radially between the upstream internal annular wall and the upstream external annular wall, and in particular extending circumferentially. The braided gasket is for example arranged axially upstream of the first portion of the connecting members. As an order of magnitude, the largest transverse dimension of the braided gasket at rest, in this case, may be between 20 and 40 mm, i.e. a dimension equivalent to the radial height of the connecting member.

In this latter case, the sealing system may comprise a support for the braided gasket, partially interposed radially between the upstream internal annular wall on the one hand and the connecting member and the braided gasket on the other hand, said support comprising a portion substantially parallel to the upstream internal annular wall and a curved portion extending radially, configured to axially retain the braided gasket. The support/braided gasket assembly allows ensuring fluidtightness with an acoustic cavity which is located upstream in the exhaust cone.

The downstream external annular wall is advantageously conical, for example frustoconical.

The upstream external annular wall comprises for example two half-rings assembled together so as to at least partially cover the upstream internal annular wall, in particular to completely cover a circumference of said upstream internal annular wall and at least partially axially said upstream internal annular wall.

The upstream external annular wall, the downstream external annular wall, and/or the upstream internal annular wall is/are for example made of a ceramic matrix composite (CMC) material, preferably the upstream external annular wall, the downstream external annular wall, and the upstream internal annular wall are made of a CMC material.

According to another aspect, a turbine is proposed comprising a turbine assembly as defined above.

According to another aspect, a turbine engine is proposed comprising a turbine as defined above.

BRIEF DESCRIPTION OF DRAWINGS

Other features, details and advantages will become apparent upon reading the detailed description below, and upon analyzing the attached drawings, in which.

DESCRIPTION OF EMBODIMENTS

Figure 1:
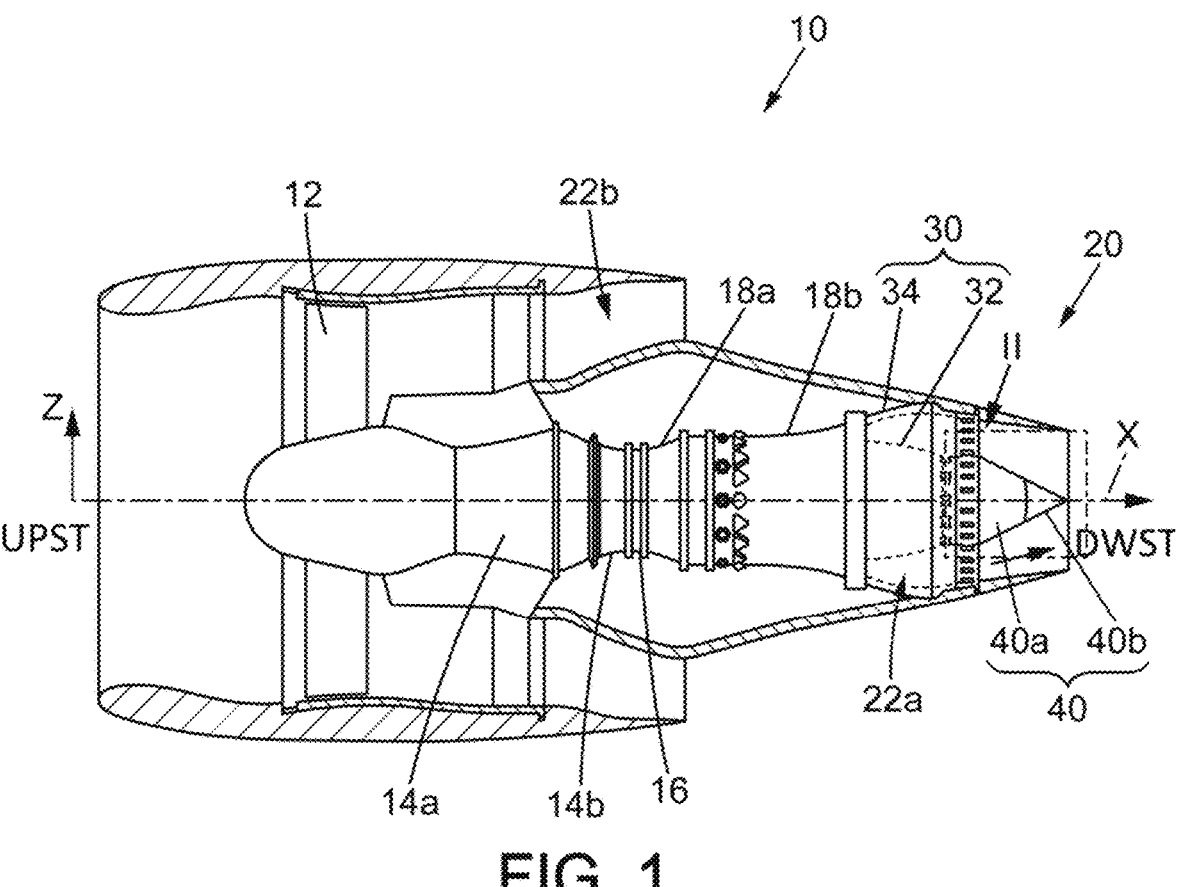
FIG. 1 is a schematic axial view of a turbine engine, in particular in accordance with the invention.
Figure 2:
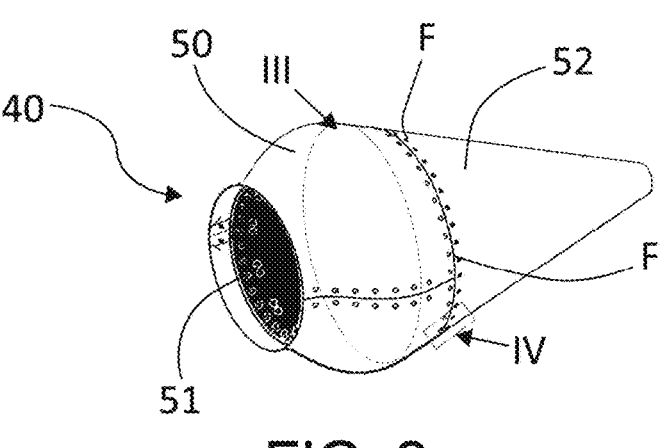
FIG. 2 is a schematic perspective view of detail II of FIG. 1, namely an exhaust cone of a turbine engine, represented in the assembled form according to the prior art.
Figure 3:
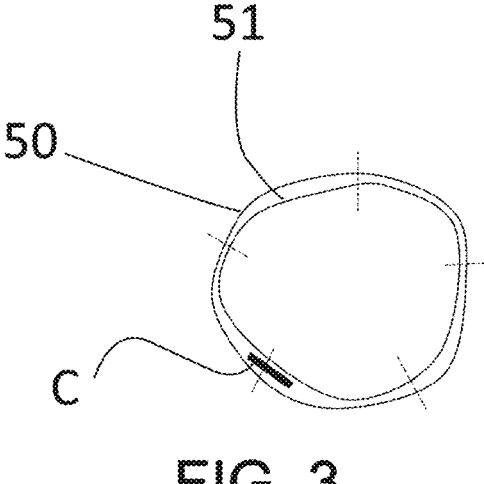
FIG. 3 is a schematic cross-section view along III of the exhaust cone of FIG. 2.
Figure 5:
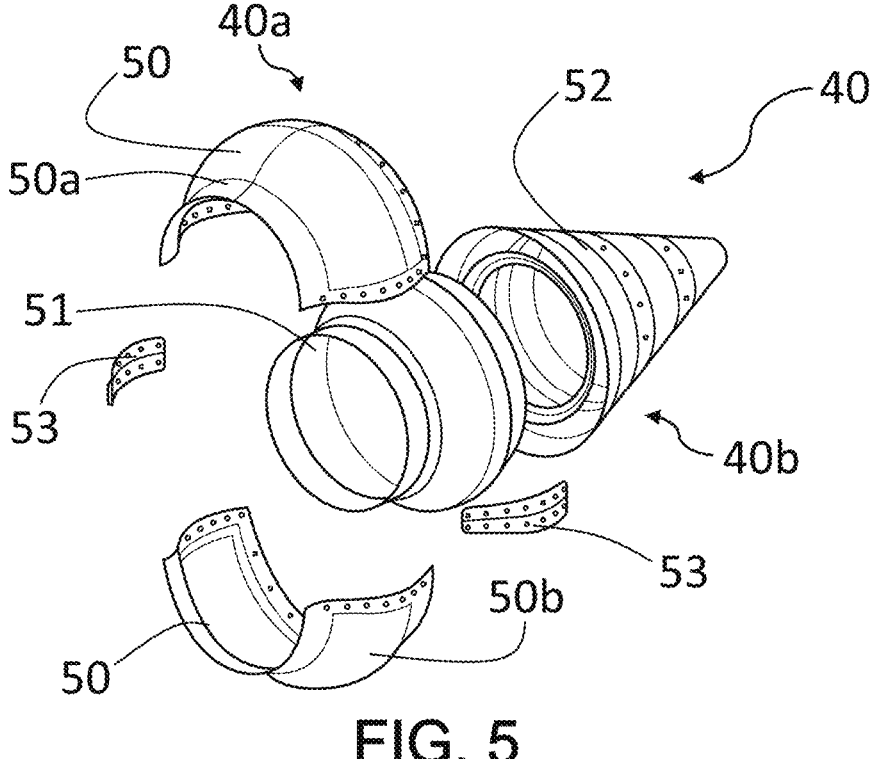
FIG. 5 is a schematic exploded perspective view of an example of an exhaust cone according to the invention which is part of a turbine engine turbine assembly as illustrated in FIG. 1.
Figure 6:
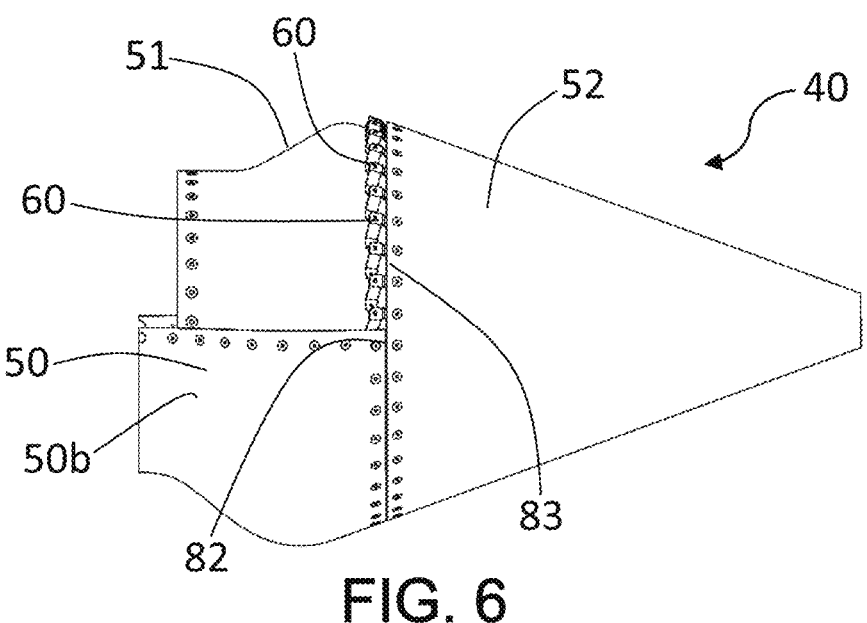
FIG. 6 is a schematic side view of the exhaust cone of FIG. 5, partially assembled.

FIG. 5 shows the exhaust cone 40 of a turbine assembly for a turbine engine 10 such as the one illustrated in FIG. 1, exhaust cone 40 comprising an upstream portion 40$a$ and a downstream portion 40$b$. Upstream portion 40$a$ comprises an upstream internal annular wall 51 and an upstream external annular wall 50 radially surrounding upstream internal annular wall 51. In this example, upstream external annular wall 50 comprises two half-rings 50$a$ and 50$b$ which are assembled together around upstream internal annular wall 51 by means of two attachment parts 53 arranged diametrically opposite one another. Downstream portion 40$b$ comprises a downstream external annular wall 52. In this example, downstream external annular wall 52 is conical in shape, with in particular, as can be seen in FIG. 6, a truncated conical end. In the illustrated example, all of walls 50, 51 and 52 are made of a ceramic matrix composite (CMC) material.

To assemble walls 50, 51 and 52 together, the turbine assembly comprises connecting members 60 which are elastically deformable at least in an axial direction and in a radial direction, for fixing upstream external annular wall 50 and downstream external annular wall 52 to upstream internal annular wall 51. Connecting members 60 are arranged circumferentially, each connecting member 60 being fixed to upstream external annular wall 50, to downstream external annular wall 52, and to upstream internal annular wall 51. In the example illustrated, connecting members 60 are identical to one another.

Due to the presence of connecting members 60 and to their flexibility, the geometric variations in upstream 50 and downstream 52 external annular walls and in upstream internal annular wall 51 are compensated for.

Furthermore, by minimizing the installation stresses in the walls made of CMC, in this example walls 50, 51 and 52, the thermomechanical properties during operation are maximized.

In the example illustrated in FIGS. 5 to 14, each connecting member 60 is made as a single piece of metal. Connecting member 60 comprises a first portion 60$a$ and a second portion 60$b$, first portion 60$a$ connecting upstream internal annular wall 51 to upstream external annular wall 50 and second portion 60$b$ connecting upstream external annular wall 50 to downstream external annular wall 52.

It is not outside the scope of the invention if the first portion connects upstream internal annular wall 51 to downstream external annular wall 52 and the second portion connects downstream external annular wall 52 to upstream external annular wall 50. It is also not outside the scope of the invention if the first portion connects upstream internal annular wall 51 to upstream external annular wall 50 and the second portion connects upstream internal annular wall 51 to downstream external annular wall 52.

Figure 7:
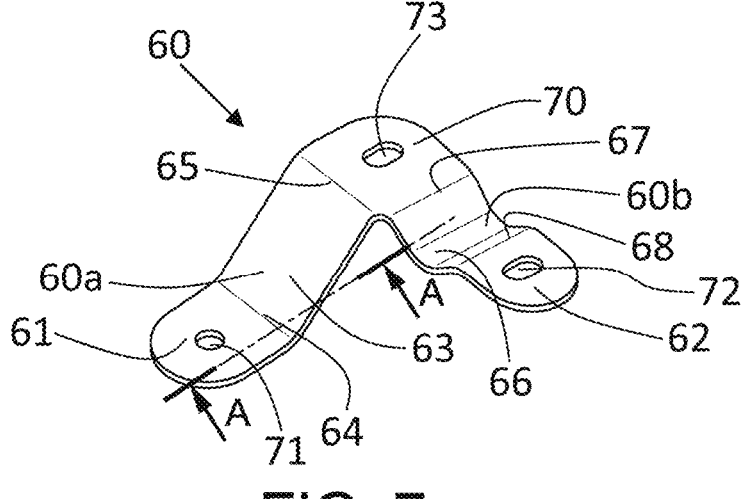
FIG. 7 illustrates an example of a connecting member of the exhaust cone of FIG. 5 in isolation, in a schematic perspective view, FIG. 8 schematically shows a partial cross-section along A-A represented in FIG. 7, of the exhaust cone of FIG. 5.

As illustrated in FIG. 7 in particular, first portion 60$a$ comprises a first attachment lug 61 for fixing to upstream internal annular wall 51. Second portion 60$b$ comprises a second attachment lug 62 for fixing to downstream external annular wall 52. Connecting member 60 further comprises a third attachment lug 70 for fixing to upstream external annular wall 50. Third attachment lug 70 connects first and second portions 60$a$ and 60$b$. First portion 60$a$ comprises a first intermediate portion 63 connecting first attachment lug 61 and third attachment lug 70. Second portion 60$b$ comprises a second intermediate portion 66 connecting second attachment lug 62 and third attachment lug 70.

In the illustrated example, each connecting member 60 has an L shape when viewed from above, with two arms connected by an angle portion. First and second portions 60$a$ and 60$b$ respectively form the arms of the L, being connected to each other at the angle portion, occupied in this example by third attachment lug 70 as can be seen in particular in FIG. 6. The arms of the L extend substantially in directions perpendicular to each other.

The width of first portion 60$a$ of connecting member 60 at first intermediate portion 63 is for example equal to 30 mm. The width of second portion 60$b$ of connecting member 60 at second intermediate portion 66 is preferably equal to the width of first portion 60$a$ at first intermediate portion 63. The length of intermediate portion 63 may be equal to 42 mm, and the length of second intermediate portion 66 may be equal to 30 mm when not deployed. The thickness of each connecting member 60 may be constant, being approximately equal to 1 mm.

Figure 8:
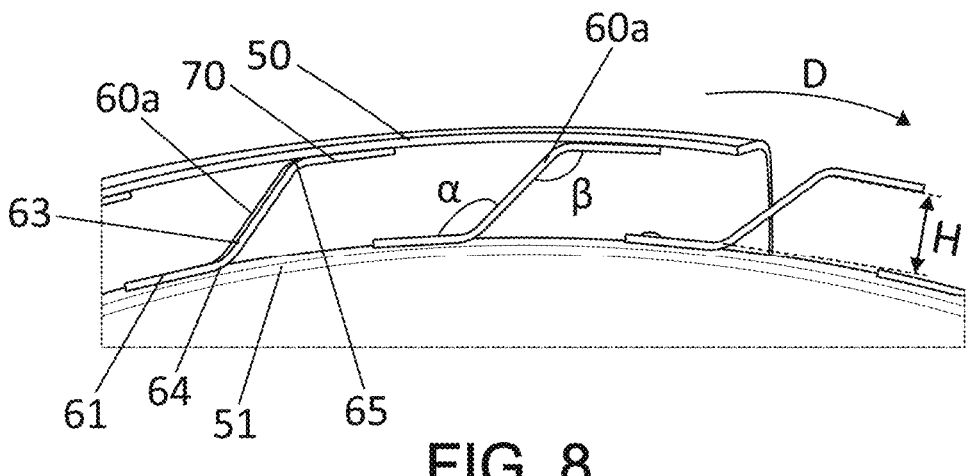

In the illustrated example, first attachment lug 61 and third attachment lug 70 of first portion 60$a$ extend from first intermediate portion 63 in opposite directions along the circumferential direction, as can be seen for example in FIG. 8.

First intermediate portion 63 has a generally planar shape in the illustrated example and has two ends 64 and 65 respectively attached to first and third attachment lugs 61 and 70, first intermediate portion 63 having a non-zero radial component. Thus, there is a height difference H radially between attachment lugs 61 and 70. In this example, H is equal to approximately 30 mm in the unassembled state. Height H is of course variable due to the radial elasticity of connecting member 60 and the radial and/or axial stresses to which connecting member 60 is subjected when trapped between upstream internal annular wall 51 and upstream external annular wall 50.

As can be seen in FIG. 8, in a radial plane, an angle α formed between first attachment lug 61 and first intermediate portion 63 is substantially equal to an angle β formed between third attachment lug 70 and first intermediate portion 63, at least in the unassembled state. Angles α and β are equal to 135° in the unassembled state in this example.

Second attachment lug 62 and third attachment lug 70 extend from second intermediate portion 66 in opposite directions along the axial direction. Second intermediate portion 66 extends between two ends 67 and 68 respectively attached to second and third attachment lugs 62 and 70, second intermediate portion 66 having a curved shape, in this example an arc of a circle, second and third attachment lugs 62 and 70 having the same radial coordinate, at least in an unattached state. This makes it possible to maintain upstream 50 and downstream 52 external annular walls substantially at the same radial distance from the longitudinal axis X, being connected to each other by connecting members 60 fixed to walls 50 and 52 by means of attachment lugs 70 and 62.

Figure 9:
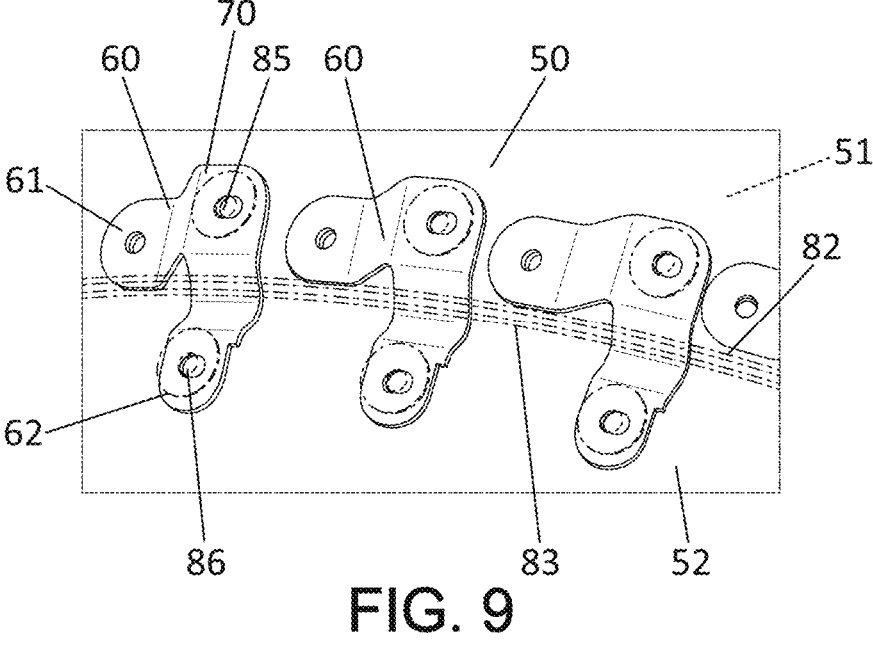
FIG. 9 is a schematic partial top view of the connecting members used to fix the walls in the exhaust cone of FIG. 5.
Figure 10:
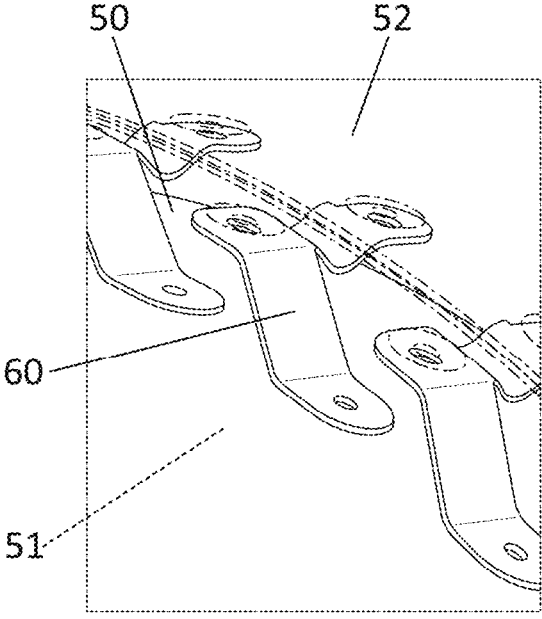
FIG. 10 is a partial schematic perspective view of the connecting members used to fix the walls in the exhaust cone of FIG. 5.

Upstream external annular wall 50 has a downstream end 82 facing an upstream end 83 of downstream external annular wall 52, as can be seen for example in FIG. 9.

Figure 4:
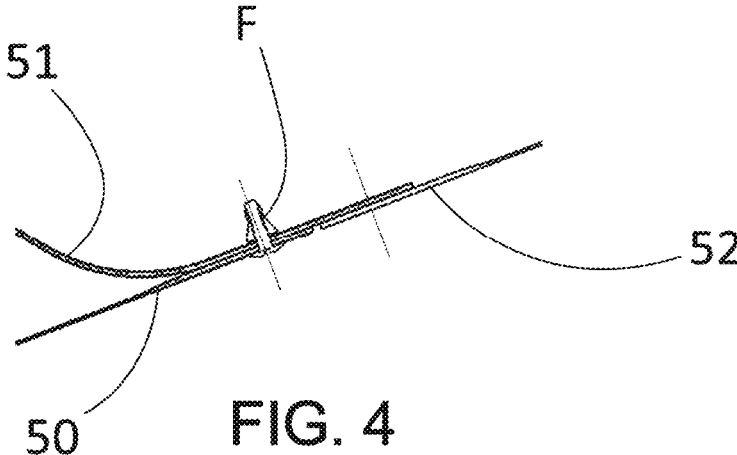
FIG. 4 is a schematic axial view of detail IV of the exhaust cone of FIG. 2.

The three attachment lugs 61, 62 and 70 have respective openings 71, 72 and 73 to allow attachment elements to pass through, such as attachment screws, not visible in the figures for clarity of the drawing. The attachment screws may be of the type illustrated in FIG. 4 in order to fix the attachment lug concerned to the corresponding wall. In the illustrated example, opening 71 is circular in shape while openings 72 and 73 have oblong shapes in the circumferential direction. The oblong shapes make it easier to mount and fix connecting member 60 to upstream external annular wall 50 and to downstream external annular wall 52, in particular in order to compensate for geometric irregularities of the walls. It is not beyond the scope of the invention if opening 71 is oblong in shape or if openings 72 and 73 are circular.

First, second, and third attachment lugs 61, 62 and 70 are substantially parallel to each other in the unassembled state in the illustrated example. Each attachment lug 61, 62 and 70 extends against wall 51, 52, 50 to which it is fixed, being in contact over its entire surface with this wall, external walls 50 and 52 being held substantially parallel to internal wall 51 by connecting members 60, as illustrated in FIG. 8. In addition, external walls 50 and 52 are held at a non-zero distance from the internal wall by means of intermediate portion 63 which has a non-zero radial component.

Figure 11:
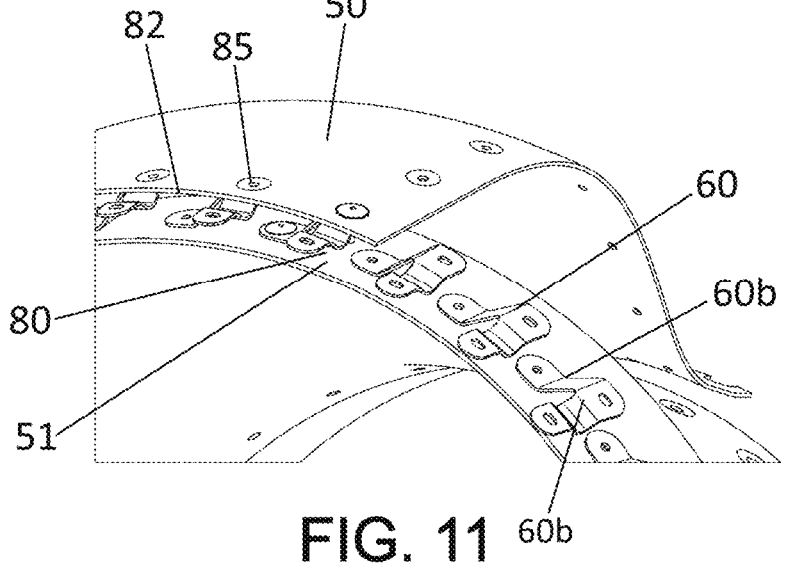
FIG. 11 is a partial schematic perspective view of the exhaust cone of FIG. 5.
Figure 12:
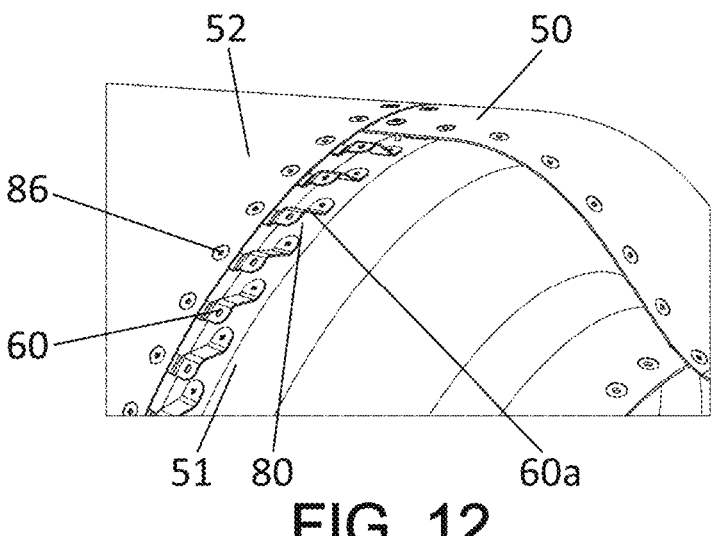
FIG. 12 is a partial schematic perspective view of the exhaust cone of FIG. 5.

As can be seen in FIG. 11, upstream internal annular wall 51 extends only under upstream external annular wall 50 and not under downstream external annular wall 52 in this example. Due to this aspect of the invention, the mass of exhaust cone 40 may be reduced. Indeed, it is not necessary for upstream internal annular wall 51 to extend under downstream external annular wall 52 since these two walls are fixed to each other by means of second portion 60*b* of connecting members 60, first portion 60*a* being fixed to upstream external annular wall 50 and upstream internal annular wall 51.

Connecting members 60 are, as can be seen for example in FIG. 9, 10, 11, or 12, arranged in an annular row 80 extending in a circumferential direction. Thus, as can be seen, all first portions 60*a* of connecting members 60 are arranged in a circumferential direction while all second portions 60*b* extend in an axial direction, all in the same directional orientation. First portions 60*a* of connecting members 60 are located near downstream end 82 of upstream external annular wall 50, in this example at a distance equal to approximately 25 mm, substantially parallel to downstream end 82. The attachment elements, in particular attachment screws, form a ring which ensures that walls 50, 51 and 52 are held in position after assembly and attachment. The minimum spacing provided by connecting members 60 between internal walls 51 on the one hand and external walls 50 and 52 on the other hand is designed to be compatible with the attachment elements selected.

Points of attachment 85 and 86 made in upstream external annular wall 50 and downstream external annular wall 52 for the respective attachment of third and second attachment lugs 70 and 62 have the same radial coordinate, meaning they are located at the same level of annular circumference. Washers may be positioned around the points of attachment 85 and 86, interposed between the attachment elements and the walls concerned.

The flexibility of connecting members 60 is linked in particular to their shape, their thickness, and the material with which they are made. Therefore, the shape, the thickness and the material, and possibly other parameters of connecting members 60 are chosen so as to obtain the desired elasticity for connecting members 60.

The temperature rise during operation of turbine engine 10 generates an expansion of connecting members 60, causing a slight rotation of upstream 50 and downstream 52 external annular walls around the longitudinal axis X as indicated by arrow D in FIG. 8. This movement has no impact on the profile of the aerodynamic flow path.

The temperature rise also generates an expansion of connecting members 60 which causes a slight translation of upstream 50 and downstream 52 external annular walls along the longitudinal axis X. This movement can degrade the profile of the aerodynamic flow path, but since second portion 60*b* of connecting members 60 is used to attach downstream external annular wall 52 whose profile has lesser importance for the aerodynamic flow path, this translational movement has a reduced impact on the profile of the aerodynamic flow path.

The turbine assembly may further comprise a sealing system 90 interposed between upstream external annular wall 50 and downstream external annular wall 52 on the one hand and upstream internal annular wall 51 on the other hand.

Figure 13:
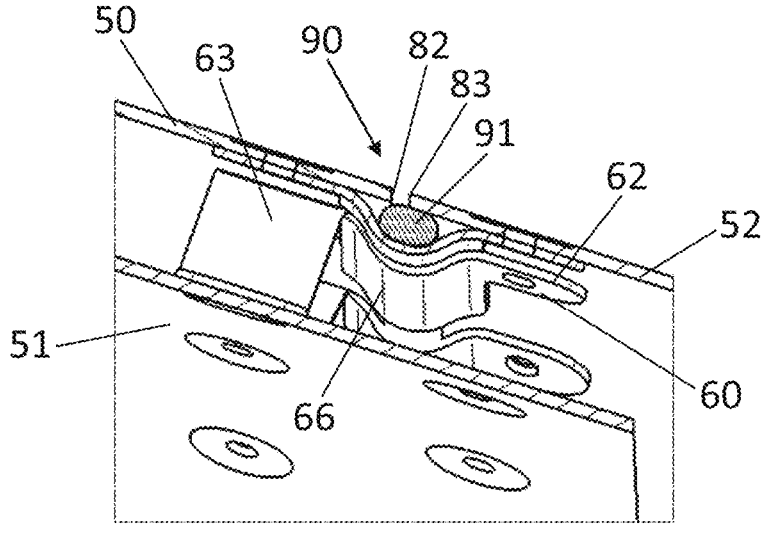
FIG. 13 is a partial schematic perspective cross-section view of an example of a sealing system for an exhaust cone according to the invention.

According to a first embodiment illustrated in FIG. 13, sealing system 90 comprises a braided gasket of small transverse dimension 91 arranged between connecting member 60, housed in this case at second intermediate portion 66 in the hollow formed by the curved portion, and downstream 52 and/or upstream 50 external annular wall, in particular at upstream 82 and downstream 83 ends of upstream 50 and downstream 51 external annular walls respectively. The largest transverse dimension of gasket 91 of small transverse dimension may be equal to 15 mm at rest. Thus, sealing is ensured in particular at the zone located between downstream 82 and upstream 83 ends of upstream 50 and downstream 52 external annular walls respectively.

Figure 14:
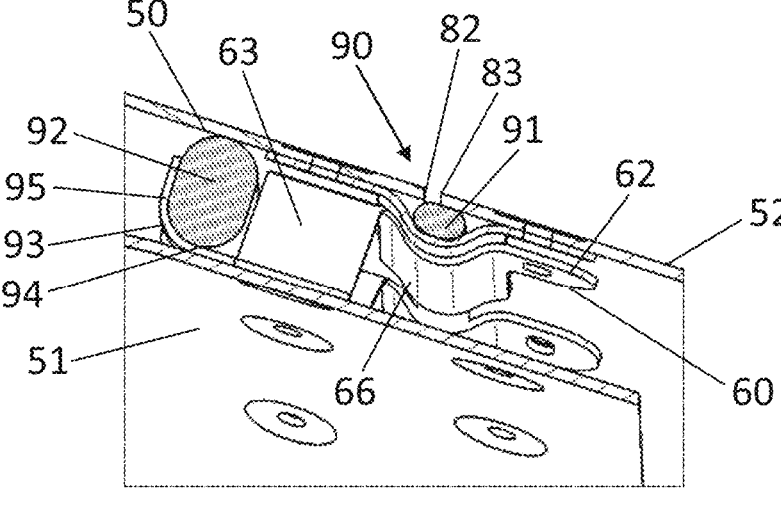
FIG. 14 is a partial schematic perspective cross-section view of another example of a sealing system for an exhaust cone according to the invention.

In the example illustrated in FIG. 14, in addition to the braided gasket of small transverse dimension 91, sealing system 90 comprises a braided gasket of large transverse dimension 92 extending circumferentially and arranged upstream of connecting members 60 along the longitudinal axis X, between upstream external annular wall 50 and upstream internal annular wall 51, the largest transverse dimension of the braided gasket of large transverse dimension being equal to 30 mm at rest in this example.

Still in the example illustrated in FIG. 14, sealing system 90 comprises a support 93 for braided gasket of large transverse dimension 92, interposed between upstream internal annular wall 51 on the one hand and connecting member 60 and braided gasket of large transverse dimension 92 on the other hand, said support 93 comprising a portion 94 substantially parallel to upstream internal annular wall 51 and a radially extending curved portion 95 configured to axially retain braided gasket of large transverse dimension 92, being in contact with the latter as can be seen. The support 93/braided gasket of large transverse dimension 92 assembly allows ensuring fluidtightness with an acoustic cavity which is located upstream in exhaust cone 40.

The invention also relates to turbine engine 10 illustrated in FIG. 1, described above, when it comprises a machine assembly as described above with an exhaust cone 40 in which the parts are assembled by means of connecting members 60 in particular, as well as the turbine of such a turbine engine 10.

This disclosure is not limited to the examples described above solely by way of example, but encompasses all variants conceivable to a person skilled in the art within the framework of the protection sought.

The invention claimed is:

1. A turbine assembly (10) for a turbine engine having a longitudinal axis (x), comprising an exhaust cone (40) comprising an upstream portion (40*a*) and a downstream portion (40*b*), the upstream portion (40*a*) comprising an upstream internal annular wall (51) and an upstream external annular wall (50) radially surrounding the upstream internal annular wall (51), the downstream portion (40*b*) comprising a downstream external annular wall (52), wherein the upstream external annular wall (50) and the downstream external annular wall (52) are fixed to the upstream internal annular wall (51) by means of a plurality of connecting members (60), said connecting members (60) being elastically deformable at least in an axial direction and in a radial direction, said connecting members (60) being arranged circumferentially, each connecting member (60) being fixed to the upstream external annular wall (50), to the downstream external annular wall (52), and to the upstream internal annular wall (51).

2. The turbine assembly according to claim 1, wherein each connecting member (60) comprises:

a first portion (60*a*) connecting the upstream internal annular wall (51) to the upstream external annular wall (50) and a second portion (60*b*) connecting the upstream external annular wall (50) to the downstream external annular wall (52), or a first portion (60*a*) connecting the upstream internal annular wall (51) to the downstream external annular wall (52) and a second portion (60*b*) connecting the downstream external annular wall (52) to the upstream external annular wall (50), or a first portion (60*a*) connecting the upstream internal annular wall (51) to the upstream external annular wall (50) and a second portion (60*b*) connecting the upstream internal annular wall (51) to the downstream external annular wall (52).

3. The turbine assembly according to claim 2, wherein the first portion (60*a*) connects the upstream internal annular wall (51) to the upstream external annular wall (50) and the second portion (60*b*) connects the upstream external annular wall (50) to the downstream external annular wall (52).

4. The turbine assembly according to claim 2, wherein said first portion (60*a*) comprises a first attachment lug (61) for fixing to a first of said walls (50; 51; 52), said second portion (60*b*) comprises a second attachment lug (62) for fixing to a second of said walls (51; 52, 50), each connecting member (60) comprising a third attachment lug (70) for fixing to a third of said walls (52; 50; 51), the first and second portions (60*a*, 60*b*) being connected at said third attachment lug (70), the first portion (60*a*) comprising a first intermediate portion (63) connecting the first attachment lug (61) and the third attachment lug (70), the second portion (60*b*) comprising a second intermediate portion (66) connecting the second attachment lug (62) and the third attachment lug (70).

5. The turbine assembly according to claim 4, wherein said first attachment lug (61) is fixed to the upstream internal annular wall (51), said second attachment lug (62) is fixed to the downstream external annular wall (52), and said third attachment lug (70) is fixed to the upstream external annular wall (50).

6. The turbine assembly according to claim 4, the first portion (60*a*) connecting the upstream internal annular wall (51) to the upstream external annular wall (50) and the second portion (60*b*) connecting the upstream external annular wall (50) to the downstream external annular wall (52), wherein the first attachment lug (61) and the third attachment lug (70) of the first portion (60*a*) extend from the first intermediate portion (63) in opposite directions along the circumferential direction.

7. The turbine assembly according to claim 6, wherein the first intermediate portion (63) has a generally planar shape and comprises two ends (64, 65) respectively attached to the first and third attachment lugs, the first intermediate portion having a non-zero radial component.

8. The turbine assembly according to claim 4, the first portion (60*a*) connecting the upstream internal annular wall (51) to the upstream external annular wall (50) and the second portion (60*b*) connecting the upstream external annular wall (50) to the downstream external annular wall (52), wherein the second attachment lug (62) and the third attachment lug (70) extend from the second intermediate portion (66) in opposite directions along the axial direction.

9. The turbine assembly according to claim 8, wherein the second intermediate portion (66) extends between two ends (67, 68) respectively attached to the second and third attachment lugs (62, 70), the second intermediate portion (66) having a curved shape, the second and third attachment lugs (62, 70) having substantially the same radial coordinate, at least in an unattached state.

10. The turbine assembly according claim 4, wherein the first, second, and/or third attachment lugs (61, 62, 70) are substantially parallel to each other in the unassembled state.

11. The turbine assembly according to claim 4, wherein the three attachment lugs (61, 62, 70) respectively comprise openings (71, 72, 73) to allow attachment elements to pass through, at least one of said openings (71, 72, 73) having an oblong shape.

12. The turbine assembly according to claim 11, wherein the openings (72, 73) in the second attachment lug (62) and in the third attachment lug (70) are oblong in shape and the opening (71) in the first attachment lug (61) is circular.

13. The turbine assembly according to claim 4, comprising a sealing system (90) interposed between the upstream external annular wall (50) on the one hand, and the downstream external annular wall (52) or the upstream internal annular wall (51) on the other hand.

14. The turbine assembly according to claim 13, wherein the sealing system (90) comprises a braided gasket (91) arranged radially between the connecting member (60), and the upstream (50) and downstream (52) external annular walls.

15. The turbine assembly according to claim 13, wherein the sealing system comprises a braided gasket (92) extending radially between the upstream internal annular wall (51) and the upstream external annular wall (50).

16. The turbine assembly according to claim 15, wherein the sealing system (90) comprises a support (93) for the braided gasket (92), partially interposed radially between the upstream internal annular wall (51) on the one hand and the connecting member (60) and braided gasket (92) on the other hand, said support (93) comprising a portion (94) substantially parallel to the upstream internal annular wall (51) and a curved portion (95) extending radially, configured to axially retain the braided gasket (92).

17. The turbine assembly according to claim 2, wherein each connecting member (60) has an L shape when viewed from above, with two arms connected by an angle portion, said first and second portions (60$a$, 60$b$) respectively forming the arms of the L and connected to each other at the angle portion of the L.

18. The turbine assembly according to claim 1, wherein at least one of the upstream external annular wall (50), the downstream external annular wall (52), and the upstream internal annular wall (51) are made of a ceramic matrix composite (CMC) material.

19. The turbine assembly according to claim 18, wherein the upstream external annular wall (50), the downstream external annular wall (52), and the upstream internal annular wall (51) are made of a ceramic matrix composite (CMC) material.

20. A turbine comprising the turbine assembly according to claim 1.

21. A turbine engine comprising a turbine having the turbine assembly according to claim 1.

\* \* \* \* \*